(12) United States Patent
Prushinskiy et al.

(10) Patent No.: US 8,879,032 B2
(45) Date of Patent: Nov. 4, 2014

(54) ALIGNMENT LAYER FOR DISPLAY DEVICE, LIQUID CRYSTAL DISPLAY DEVICE INCLUDING THE SAME AND METHOD AND APPARATUS FOR TREATING THE SAME

(75) Inventors: Valeriy Prushinskiy, Hwaseong-si (KR); Len Kaplan, Yongin-si (KR); Won-Sik Hyun, Yongin-si (KR); Heung-Yeol Na, Yongin-si (KR); Min-Soo Kim, Yongin-si (KR); Seon-Hong Ahn, Yongin-si (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 135 days.

(21) Appl. No.: 13/305,431

(22) Filed: Nov. 28, 2011

(65) Prior Publication Data

US 2013/0057814 A1 Mar. 7, 2013

(30) Foreign Application Priority Data

Sep. 5, 2011 (KR) .................. 10-2011-0089784

(51) Int. Cl.
*G02F 1/1337* (2006.01)
*G02F 1/1343* (2006.01)

(52) U.S. Cl.
CPC .... *G02F 1/133784* (2013.01); *G02F 1/134363* (2013.01)
USPC ............ 349/124; 349/126; 349/129; 349/132

(58) Field of Classification Search
CPC .......................................... G02F 2001/133757
USPC .................... 349/129, 132, 126, 124
See application file for complete search history.

(56) References Cited

U.S. PATENT DOCUMENTS

| | | | | |
|---|---|---|---|---|
| 5,280,375 A * | 1/1994 | Tsuda et al. | .................. | 349/128 |
| 5,963,286 A | 10/1999 | Ishibashi et al. | | |
| 6,624,863 B1 * | 9/2003 | Jacobs et al. | .................. | 349/126 |
| 7,177,001 B2 * | 2/2007 | Lee | ................................. | 349/141 |
| 8,077,279 B2 * | 12/2011 | Terashita et al. | ............. | 349/129 |
| 2002/0097361 A1 * | 7/2002 | Ham | ............................. | 349/129 |
| 2009/0002588 A1 * | 1/2009 | Lee et al. | ........................ | 349/42 |

FOREIGN PATENT DOCUMENTS

| | | |
|---|---|---|
| JP | 5-249466 | 9/1993 |
| KR | 1999-0075414 | 10/1999 |
| KR | 10-0297399 | 5/2001 |

* cited by examiner

*Primary Examiner* — Edward Glick
*Assistant Examiner* — Dennis Y Kim
(74) *Attorney, Agent, or Firm* — Robert E. Bushnell, Esq.

(57) ABSTRACT

An alignment layer for a display device may include a plurality of rubbed patterns formed on its surface, wherein each of the rubbed patterns includes a first pattern intersecting a center axis at a first angle, and a second pattern connected to the first pattern and intersecting the center axis at a second angle, and the first pattern and the second pattern are alternately repeated. A liquid crystal display device includes the alignment layer, and a method and apparatus for treating the alignment layer are provided.

11 Claims, 19 Drawing Sheets

ALIGNMENT LAYER FOR DISPLAY DEVICE, LIQUID CRYSTAL DISPLAY DEVICE INCLUDING THE SAME AND METHOD AND APPARATUS FOR TREATING THE SAME

CLAIM OF PRIORITY

This application makes reference to, incorporates the same herein, and claims all benefits accruing under 35 U.S.C. §119 from an application earlier filed in the Korean Intellectual Property Office on the 5 of Sep. 2011 and there duly assigned Serial No. 10-2011-0089784.

BACKGROUND OF THE INVENTION

1. Field of the Invention

The present invention relates to an alignment layer for a display device, a liquid crystal display device including the same, and a method and apparatus for treating the same, and more particularly to a rubbed alignment layer for a display device, a liquid crystal display device including the rubbed alignment layer, and a method and apparatus for rubbing the alignment layer.

2. Description of the Related Art

A liquid crystal display device is a display device for controlling light retardation by causing a change in the refractive index of liquid crystals such that alignment of the liquid crystals is changed according to a potential difference between a voltage applied to a common electrode and a voltage applied to a pixel electrode. In order to improve a response speed of the liquid crystal display device by imparting a predetermined direction to liquid crystals and to increase visibility of the liquid crystal display device, the liquid crystal display device may include an alignment layer formed on a surface contacting a liquid crystal layer of an upper or lower substrate of a liquid crystal panel.

In order to orient the liquid crystals, the alignment layer may be treated by, for example, rubbing, oblique deposition, polymer stretching, optical alignment, ion beam irradiation, and so on. Among others, the rubbing is to treat the alignment layer by rubbing or abrading a surface of the alignment layer in a desired direction using a rubbing member.

Since liquid crystal particles have an index of refraction anisotropy, the liquid crystal display device may display different images according to the viewer's observation angle. In order to widen the viewing angle of a liquid crystal display device, the liquid crystal display device may include a plurality of domains. Compared to a liquid crystal display device having a single domain, the liquid crystal display device having multiple domains may have a reduced difference in the average refractive indices of liquid crystal particles viewed according to the viewing angle, thereby achieving widening of the viewing angle of the liquid crystal display device.

In order to multiply domains, several approaches, including adjusting electrode patterns, forming protrusions for separating domains, etc., may be attempted. However, these approaches are very complicated and may affect display characteristics, for example, brightness.

SUMMARY OF THE INVENTION

The present invention provides an alignment layer having a zigzag-shaped rubbed pattern, which establishes directionality of liquid crystal alignment.

The present invention also provides a liquid crystal display device including an alignment layer having a zigzag-shaped rubbed pattern, which establishes directionality of liquid crystal alignment.

The present invention also provides a method of treating an alignment layer having a zigzag-shaped rubbed pattern, which establishes directionality of liquid crystal alignment.

The present invention also provides an apparatus for treating an alignment layer having a zigzag-shaped rubbed pattern, which establishes directionality of liquid crystal alignment.

These and other objects of the present invention will be described in, or be apparent from, the following description of the preferred embodiments.

According to an aspect of the present invention, there is provided an alignment layer for a display device. The alignment layer may include a plurality of rubbed patterns formed on its surface, wherein each of the plurality of rubbed patterns includes a first pattern intersecting the center axis at a first angle, and a second pattern connected to the first pattern and intersecting the center axis at a second angle, the first pattern and the second pattern being alternately repeated.

According to another aspect of the present invention, there is provided a liquid crystal display device which may include a first insulating substrate, a second insulating substrate positioned above the first insulating substrate and facing the first insulating substrate, and a liquid crystal layer formed between the first insulating substrate and the second insulating substrate, wherein at least one of the first insulating substrate and the second insulating substrate includes an alignment layer having a zigzag-shaped rubbed pattern formed on a surface facing the liquid crystal layer.

According to still another aspect of the present invention, there is provided a method of treating an alignment layer. The method may include preparing a display panel having an alignment layer on its one surface, placing the display panel on a support, bringing a rubbing member into contact with the alignment layer, and rubbing the alignment layer by transferring the alignment layer and the rubbing member relatively with respect to each other, wherein the rubbing of the alignment layer comprises transferring the rubbing member or the alignment layer in a first direction while allowing the rubbing member to reciprocate relative to the alignment layer in a second direction different from the first direction.

According to a further aspect of the present invention, there is provided an apparatus for treating an alignment layer. The apparatus may include a support that supports a display panel having an alignment layer on its one surface, a first transfer means that transfers the rubbing member or the support in a first direction at a first relative speed, and a second transfer means that transfers the rubbing member or the support to reciprocate in a second direction, different from the first direction, at a second relative speed.

The embodiments of the present invention provide at least the following effects.

That is to say, the embodiments of the present invention may provide an alignment layer including a zigzag-shaped rubbed pattern, which can be used for a display device having liquid crystals which are aligned in different directions, and a liquid crystal display device using the alignment layer.

In addition, according to the embodiments of the present invention, a plurality of domains having liquid crystals aligned in different directions can be formed by the zigzag-shaped rubbed pattern, thereby improving a viewing angle of the liquid crystal display device.

Furthermore, according to the embodiments of the present invention, the alignment layer and the display device can be easily manufactured without involving complicated processes, thereby improving the processing efficiency.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
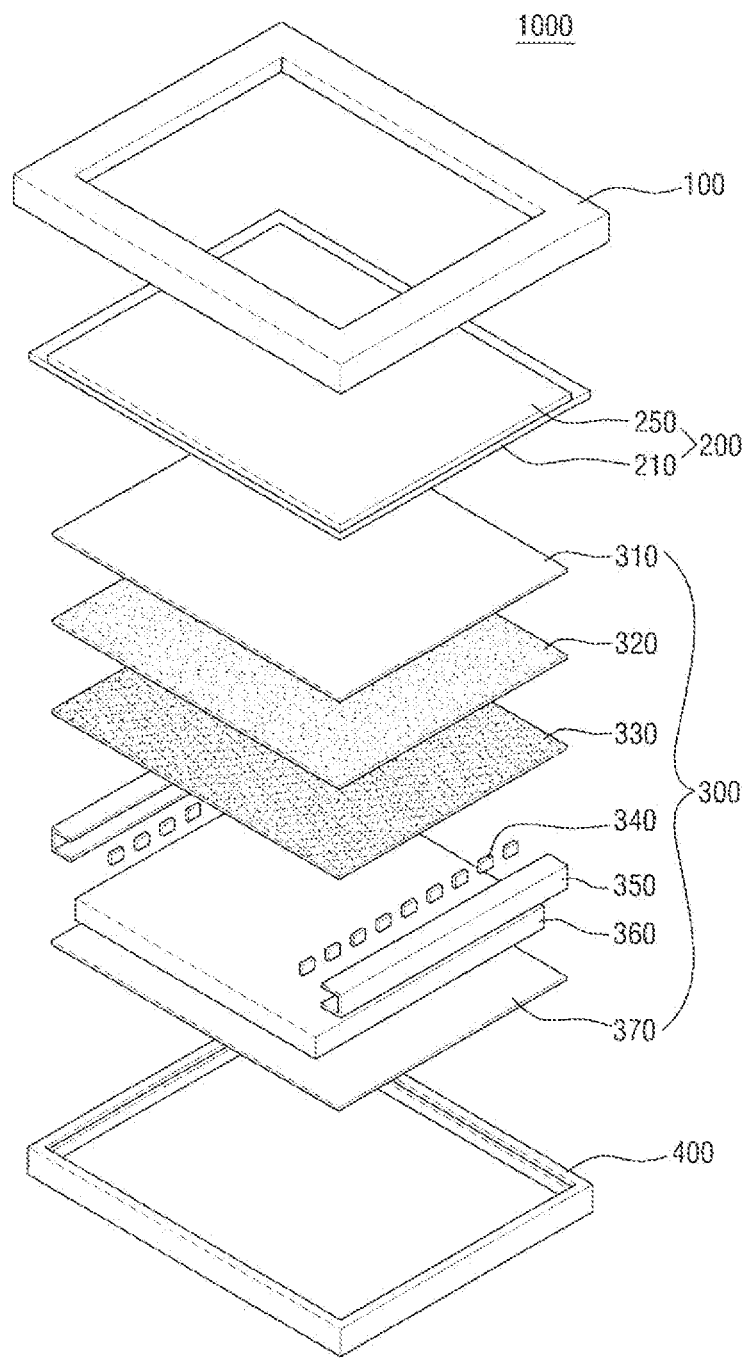
FIG. 1 is an exploded perspective view of a liquid crystal display device according to an embodiment of the present invention.

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. The same reference numbers indicate the same components throughout the specification. In the attached figures, the thickness of layers and regions is exaggerated for clarity.

It will also be understood that, when a layer is referred to as being "on" another layer or substrate, it can be directly on the other layer or substrate, or intervening layers may also be present. In contrast, when an element is referred to as being "directly on" another element, there are no intervening elements present.

Spatially relative terms, such as "beneath," "below," "lower," "above," "upper" and the like, may be used herein for ease of description to describe one element or feature's relationship to another element or feature or other elements or features, as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein may be interpreted accordingly.

The use of the terms "a", "an" and "the", and similar references, in the context of describing the invention (especially in the context of the following claims) is to be construed as covering both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Unless defined otherwise, all technical and scientific terms used herein have the same meaning as commonly understood by one of ordinary skill in the art to which this invention belongs. It is noted that the use of any and all examples, or exemplary terms, provided herein is intended merely to better illuminate the invention and is not a limitation on the scope of the invention unless otherwise specified. Furthermore, unless defined otherwise, all terms defined in generally used dictionaries may not be overly interpreted.

The present invention will be described with reference to perspective views, cross-sectional views, and/or plan views, in which preferred embodiments of the invention are shown. Thus, the profile of an exemplary view may be modified according to manufacturing techniques and/or allowances. That is, the embodiments of the invention are not intended to limit the scope of the present invention, but cover all changes and modifications that can be caused due to a change in manufacturing process. Thus, regions shown in the drawings are illustrated in schematic form and the shapes of the regions are presented simply by way of illustration and not as a limitation.

Embodiments of the present invention will be described with reference to the accompanying drawings.

FIG. 1 is an exploded perspective view of a liquid crystal display device according to an embodiment of the present invention.

Referring to FIG. 1, the liquid crystal display device 1000 may include a top receiving container 100, a display panel 200, a backlight assembly 300 and a bottom receiving container 400.

The top receiving container 100 and the bottom receiving container 400 form a space in which to receive the display panel 200 and the backlight assembly 300.

The display panel 200 includes a first substrate 210, a second substrate 250 and a liquid crystal layer (not shown) interposed between the first and second substrates 210 and 250, respectively. Each of the first substrate 210 and the second substrate 250 may include an alignment layer (not shown) formed on a surface contacting the liquid crystal layer. Each alignment layer includes a zigzag-shaped rubbed pattern to form two or more domains by differently setting initial alignment directions of liquid crystals. The alignment layer will be described later in more detail.

Although not shown, the display panel 200 may further include a driver. The driver may be mounted on the first substrate 210. The driver may be formed as a separate chip to then be attached to the first substrate 210 using a chip on film (COF) process, a tape carrier package (TCP) process, or a chip on glass (COG) process.

The backlight assembly 300 is disposed below the display panel 200. The backlight assembly 300 may include optical films 310, 320 and 330, a lamp 340, a reflective cover 350, a light guide plate 360 and a reflection plate 370.

The optical films may include one or more of a protection film 310, a prism sheet 320 and a diffusion sheet 330, and may allow light to be evenly incident throughout the display panel 200 by controlling a traveling direction of light or diffusing the light.

The lamp 340 is provided under the optical films 310, 320 and 330. The lamp 340 emits light and may include a light emitting diode (LED), a cold cathode fluorescent lamp (CCFL) or an external electrode fluorescent lamp (EEFL).

The backlight assembly 300 may further include the reflective cover 350 to receive the lamp 340. The reflective cover 350 may have a 'U' shape, for example. The reflective cover 350 reflects the light generated from the lamp 340 toward the light guide plate 360.

The light guide plate 360 guides the light supplied from the lamp 340 and transmits the same to the optical films 310, 320 and 330 positioned above the light guide plate 360.

The reflection plate 370 may be disposed below the light guide plate 360 and may reflect the light from the reflection plate 370 upwardly, as shown in FIG. 1, thereby improving the overall brightness.

Next, the display panel 200 will be described in detail.

Figure 2:
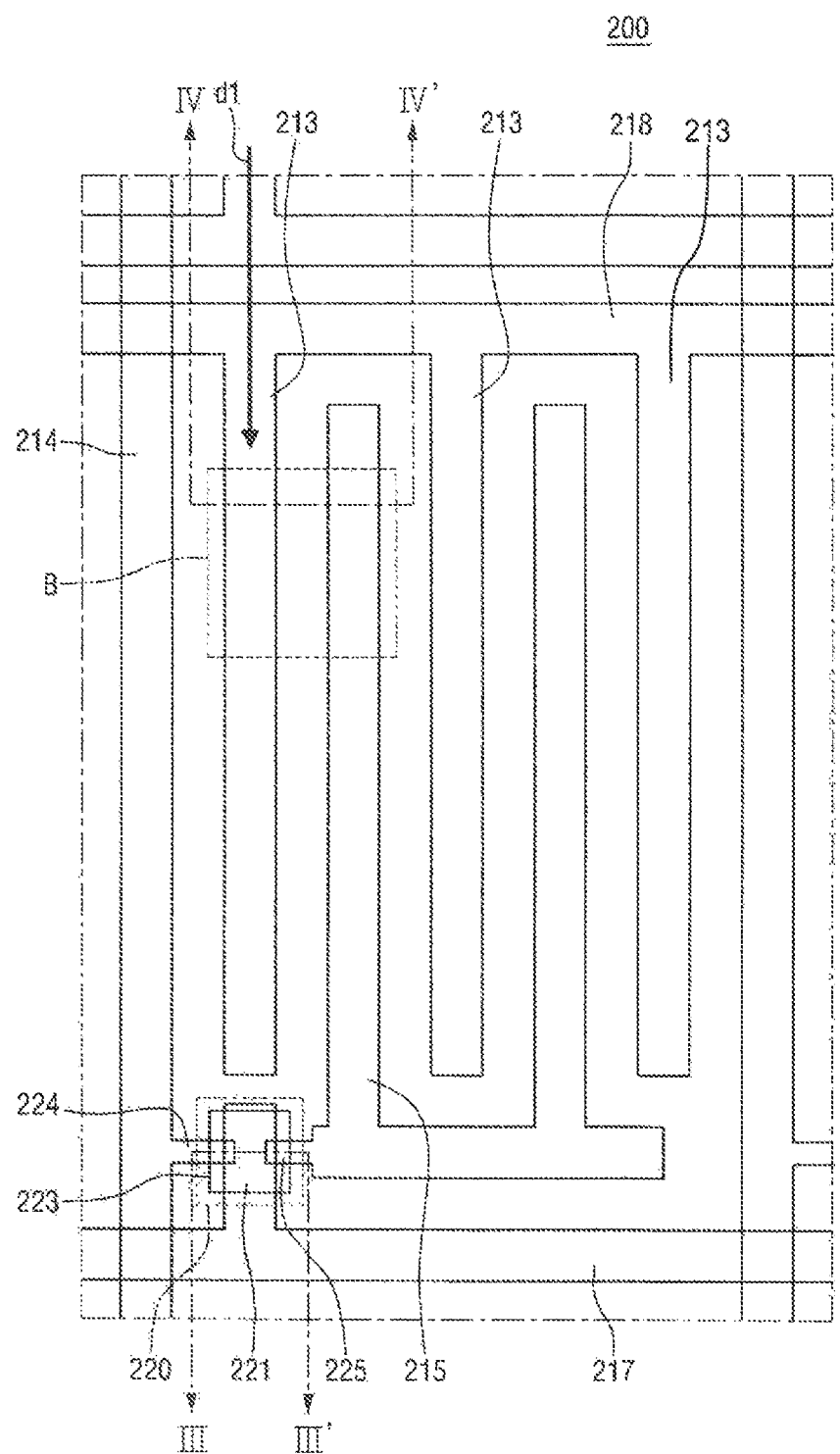
FIG. 2 is a layout view of a first substrate of a display panel according to an embodiment of the present invention.
Figure 3:
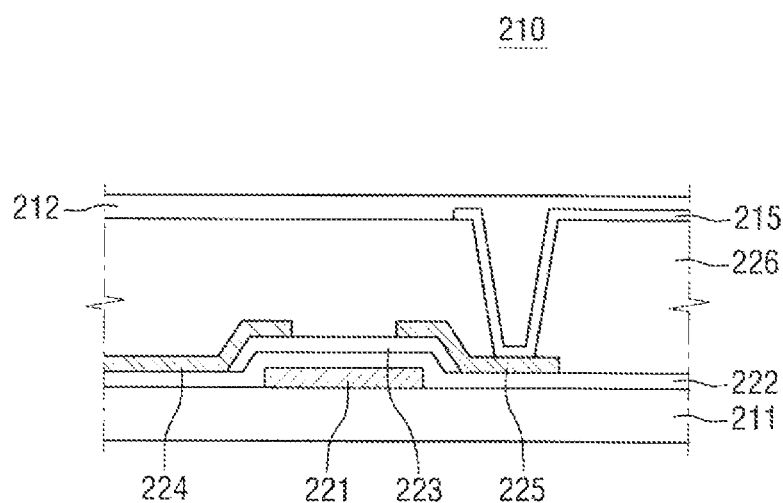
FIG. 3 is a cross-sectional view of the first substrate taken along the line III-III' of FIG. 2.
Figure 4:
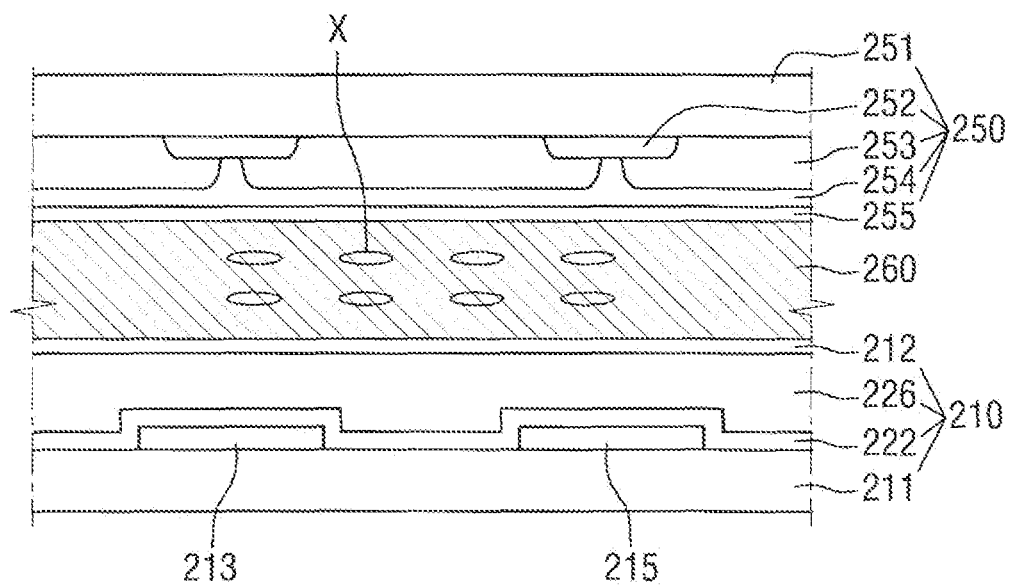
FIG. 4 is a cross-sectional view of the display panel taken along the line IV-IV' of FIG. 2.

FIG. 2 is a layout view of a first substrate of a display panel according to an embodiment of the present invention, FIG. 3 is a cross-sectional view of the first substrate taken along the line III-III' of FIG. 2, and FIG. 4 is a cross-sectional view of the display panel taken along the line IV-IV' of FIG. 2. In the latter regard, a cross section of the first substrate shown in FIG. 3 is taken along the line III-III' of FIG. 2, and a cross section of the first substrate shown in FIG. 4 is taken along the line IV-IV' of FIG. 2.

Referring to FIG. 2, the display panel 200 may include a plurality of pixels defined at regions where a plurality of gate lines 217 and a plurality of data lines 214 cross each other. The pixels may be repeatedly arranged in a matrix form.

Referring to FIGS. 2 and 3, the first substrate 210 includes a plurality of thin film transistors arrayed on a first insulating substrate 211, each of the thin film transistors including a gate electrode 221, a semiconductor layer 223, a data electrode 224 and a drain electrode 225. The drain electrode 225 is physically and electrically connected to a pixel electrode 215.

The first substrate 210 will now be described in more detail. The gate lines 217 and the gate electrodes 221, made of a conductive material, are formed on the first insulating substrate 211 made of transparent glass or plastic material. The gate lines 217 extend in a first direction, and the gate electrodes 221 may be connected to the gate lines 217. The gate electrodes 221 may extend from the gate lines 217. The gate electrodes 221 may be formed around interconnections of the gate lines 217 and the data lines 214.

A gate insulation layer 222, made of silicon nitride or silicon oxide, is stacked on the gate lines 217 and the gate electrodes 221. A semiconductor layer 223, made of hydrogenated amorphous silicon, is formed on the gate insulation layer 222. At least a portion of the semiconductor layer 223 overlaps the gate electrodes 221.

The data line 214, the data electrode 224 branched from the data line 214, and the drain electrode 225 spaced apart from the data electrode 224 made of a conductive material with respect to the gate electrode 221, are formed on the semiconductor layer 223. The data line 214 extends in a second direction perpendicular to the first direction. An ohmic contact layer (not shown), made of heavily doped n+ hydrogenated amorphous silicon, may be interposed between the data electrode 224 and the semiconductor layer 223 under the data electrode 224, and between the drain electrode 225 and the semiconductor layer 223 under the drain electrode 225. The gate electrode 221, the data electrode 224 and the drain electrode 225 constitute terminals of a thin film transistor, and the semiconductor layer 223 forms a channel portion of the thin film transistor.

An insulation layer 226 may be formed on the data electrode 224 and the drain electrode 225. The insulation layer 226 may be a stacked layer of an inorganic insulation layer and an organic insulation layer. The insulation layer 226 may be a planarization layer or a passivation layer.

A pixel electrode 215 and a common electrode 213 may be formed on the insulation layer 226. The pixel electrode 215 and the common electrode 213 may be made of a transparent material such as indium tin oxide (ITO) or indium zinc oxide (IZO). The pixel electrode 215 and the common electrode 213 are at least partially spaced apart from each other and face each other.

In more detail, according to embodiments of the present invention, the pixel electrode 215 may include a plurality of sub pixel electrodes and connecting pixel electrodes. The respective sub pixel electrodes may extend in a second direction, for example. The respective sub pixel electrodes may be electrically connected through the connecting pixel electrodes extending in the first direction. That is to say, the sub pixel electrodes may be electrodes branched from the connecting pixel electrodes. The pixel electrodes 215 may be electrically connected to the drain electrodes 225 through contacts formed in the insulation layer 226. The pixel electrode 215 formed at one pixel may be electrically disconnected from the pixel electrode 215 formed at an adjacent pixel.

The common line 218 is formed in a third direction, which may be perpendicular to the second direction and parallel to the first direction. The display panel 200 may include a plurality of common lines parallel to each other. The common electrodes 213 may be branched from the common lines 218, and a common voltage may be applied to the common electrodes 213 through the common line 218.

The common electrodes 213 may be electrodes branched from the common line 218. While FIG. 2 shows that the common electrodes 213 are branched from three points of the common line 218 and extend in a downward direction d1, the invention is not limited thereto. The common electrodes 213 may have various shapes according to the shape of the pixel electrode 215 so as to appropriately set a direction of an electric field formed by the common electrode 213 and the pixel electrode 215. In addition, the number of electrodes branched from the common electrode 213 may also vary. The respective common electrodes 213 may be electrically connected through the common lines 218 extending in, for example, the third direction. The common lines 218 may extend in the third direction to cover two or more pixels. Therefore, the common electrode 213 formed at one pixel may be electrically connected to the common electrode 213 formed at the pixel adjacent to the one pixel in the third direction through the common line 218.

A first alignment layer 212 (FIG. 3) is formed on a top surface of the first substrate 210. The first alignment layer 212 may include an inorganic material or an organic material. The inorganic material may be $SiO_2$ and the organic material may be polyimide. The first alignment layer 212 may include, for example, a zigzag-shaped rubbed pattern formed on its surface.

The second substrate 250 (FIG. 4) may include a second insulating substrate 251 made of a transparent glass or plastic material. A black matrix 252 and a color filter layer 253 are formed on the second insulating substrate 251. At least a portion of the black matrix 252 overlaps the gate line 217 and the data line 214 of FIG. 2, thereby defining a pixel. The color filter layer 253 is disposed in a space exposed by the black matrix 252. The color filter layer 253 may include, for example, red, green and blue color filter layers. An overcoat layer 254 may be formed on the color filter layer 253.

A second alignment layer 255 is formed on a bottom surface of the second substrate 250. The second alignment layer 255 may have substantially the same composition and rubbed pattern as those of the first alignment layer 212.

A spacer (not shown) may be interposed between the first substrate 210 and the second substrate 250 with a cell gap maintained. The cell gap between the first substrate 210 and the second substrate 250 is filled with liquid crystal molecules to form a liquid crystal layer 260. An initial alignment angle of liquid crystal molecules of the liquid crystal layer 260 may depend on rubbing directions of the first alignment layer 212 and/or the second alignment layer 255.

Hereinafter, the rubbed pattern of the alignment layer according to an embodiment of the present invention will be described in detail with regard to the first alignment layer 212 formed on the first substrate 210, but it is obvious that the same inventive concept may also be applied to the second alignment layer 255.

Figure 5:
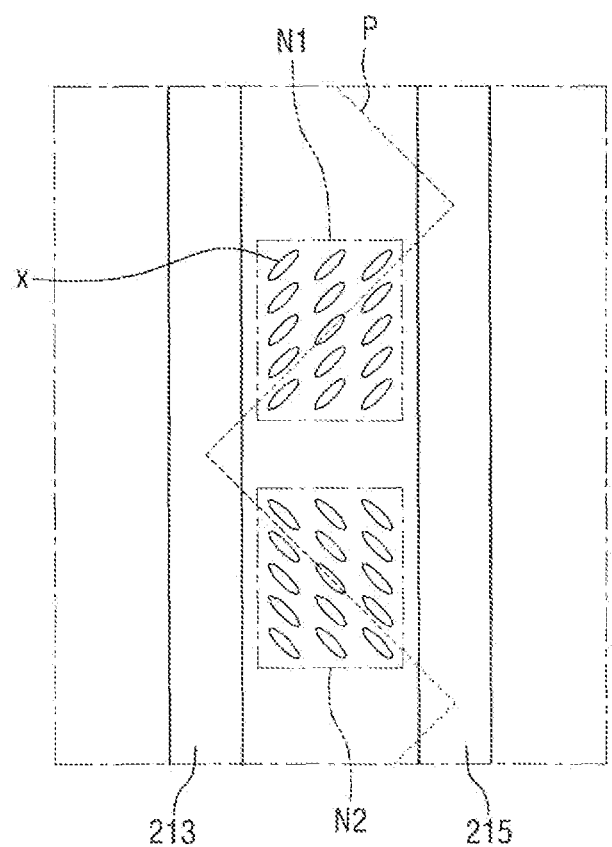
FIGS. 5 and 6 are layout views of the display panel shown in FIG. 2.
Figure 6:
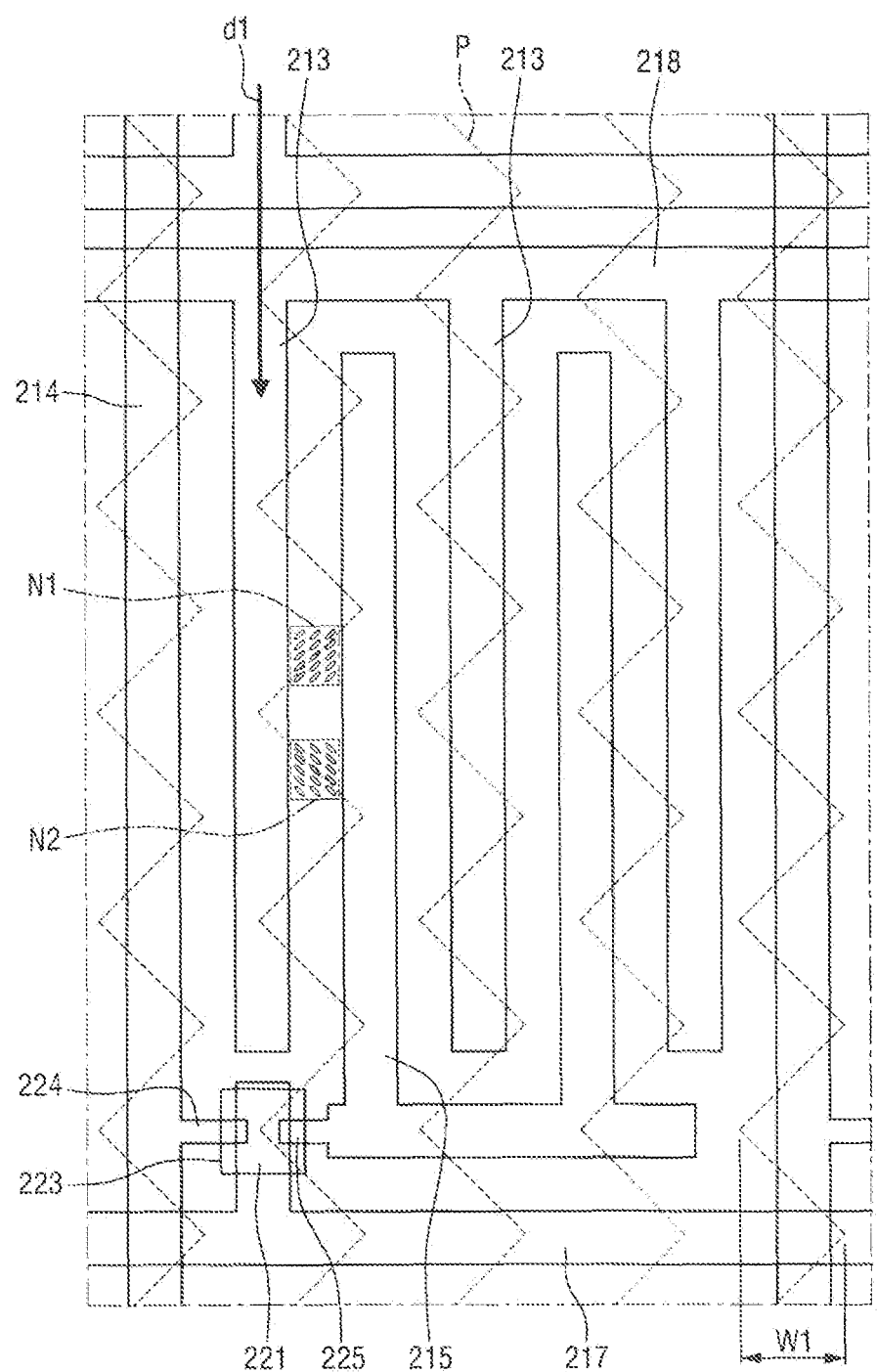
Figure 7:
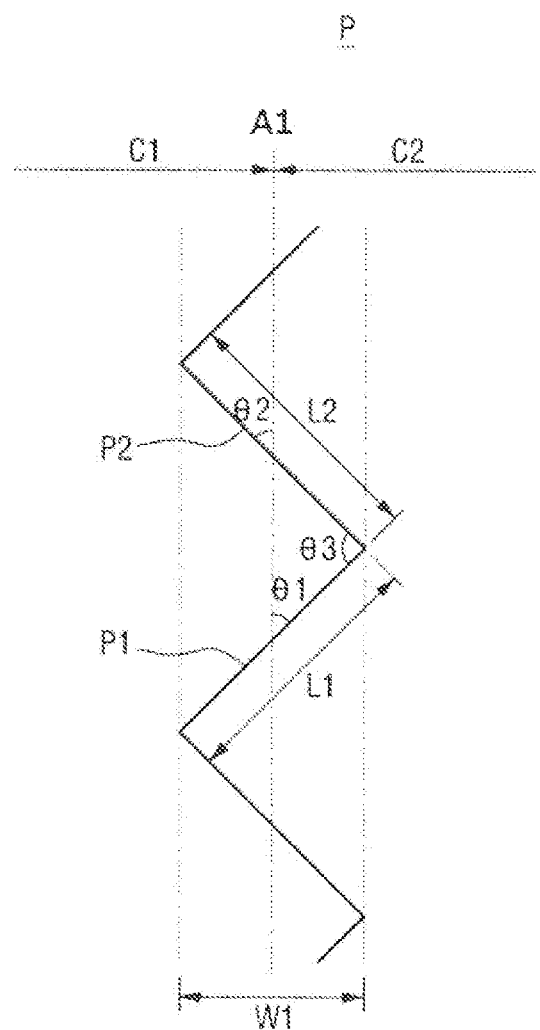
FIGS. 7 and 8 are layout views of rubbed patterns formed in an alignment layer according to an embodiment of the present invention.
Figure 8:
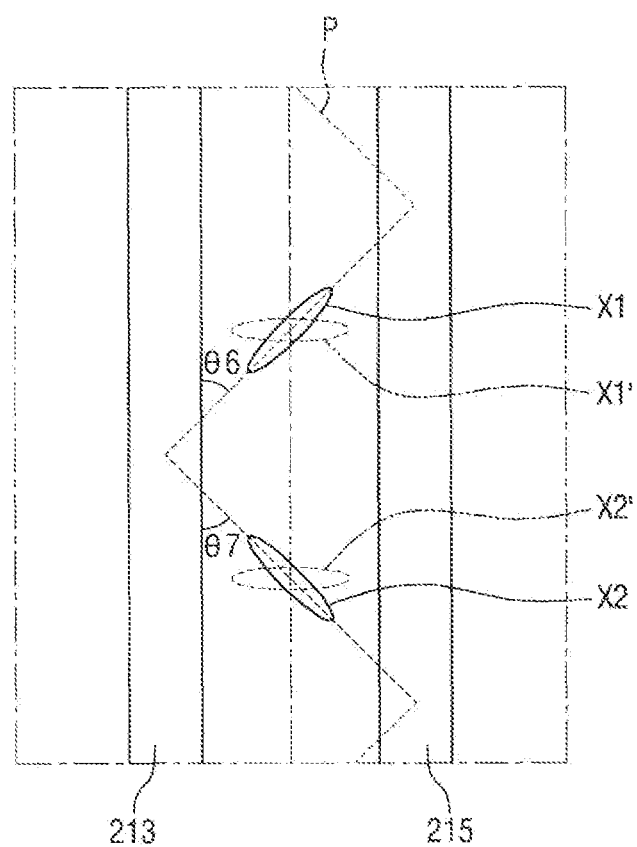

FIGS. 5 and 6 are layout views of the display panel shown in FIG. 2; and FIGS. 7 and 8 are layout views of rubbed patterns formed in an alignment layer according to an embodiment of the present invention.

Thus, FIGS. 5 to 8 illustrate a relationship between the initial alignment angle of liquid crystal molecules and the rubbed pattern of the first alignment layer formed on the first substrate of the display panel. In this embodiment, the rubbed pattern may mean a pattern formed on a surface of the alignment layer through a process of rubbing the alignment layer while bringing a rubbing member into contact with the alignment layer. The rubbed pattern may be a kind of scratch, which may or may not be discernable by the naked eye.

Referring to FIGS. 5 and 6, a rubbed pattern P of the first alignment layer may have a zigzag configuration. Liquid crystal molecules X are initially aligned such that a rubbing direction coincides with the major axis of the liquid crystal molecules X. Assuming that an alignment angle of the liquid crystal molecules X is defined as an angle formed by a reference line of the liquid crystal molecules X (for example, a first direction) and the major axis of the liquid crystal molecules X, initial alignment angles of the liquid crystal molecules X may vary by domain according to the zigzag configuration of the rubbed pattern P. The regions having different initial alignment angles constitute different domains N1 and N2. Since a plurality of domains N1 and N2 are formed in a single pixel, the overall viewing angle of the display apparatus can be improved.

In some embodiments, a rubbed pattern P having a zigzag configuration may be arranged over a plurality of pixels. That is to say, the zigzag-shaped rubbed pattern P is repeatedly arranged within a single pixel, thereby forming a plurality of domains in the single pixel. Alternatively, a first pattern P1 and a second pattern P2 may be arranged over a plurality of pixels adjacent to each other, thereby forming a plurality of domains in the plurality of pixels.

FIG. 7 is a layout view of a rubbed pattern formed in an alignment layer according to an embodiment of the present invention.

Referring to FIG. 7, the rubbed pattern P formed in the alignment layer includes a first pattern P1 and a second pattern P2 connected to each other. The first pattern P1 and the second pattern P2 have a predetermined intersecting angle of greater than 0° and smaller than 180°. In other words, an angle formed between the first pattern P1 and a specific reference line and an angle formed between the second pattern P2 and a specific reference line may be different from each other.

In detail, assuming that the rubbed pattern P is formed in an upward direction from a lower portion of FIG. 7, the first pattern P1 passes through an imaginary center axis A1 in a direction ranging from a first region C1 to a second region C2, the imaginary center axis A1 dividing a surface of the alignment layer into the first region C1 and the second region C2. Meanwhile, the second pattern P2 is connected to the first pattern P1 and passes through the imaginary center axis A1 in a direction ranging from the second region C2 to the first region C1. In some embodiments, assuming that the specific reference line is parallel to the first direction, when an angle formed between the first pattern P1 and the first direction is one of an acute angle and an obtuse angle, an angle formed between the second pattern P2 and the first direction may be the other of an acute angle and an obtuse angle.

Meanwhile, the imaginary center axis A1 shown in FIG. 7 may extend in substantially the same direction as a direction in which the pixel electrode 215 and the common electrode 213 shown in FIG. 2 extend. In this case, angles formed between each of the first pattern P1 and the second pattern P2 of the alignment layer, and the pixel electrode 215 or the common electrode 213, may be the same as stated above.

The first pattern P1 and the second pattern P2 may serve as references for dividing the liquid crystal layer into multiple domains. That is to say, as shown in FIG. 5, a first domain in which an initial alignment angle of liquid crystal molecules is formed in the same direction as the direction in which the first pattern P1 extends may be formed in a region where the first pattern P1 is formed, while a second domain in which an initial alignment angle of liquid crystal molecules is formed in the same direction as the direction in which the second pattern P2 extends may be formed in a region where the second pattern P2 is formed. In such a manner, a viewing angle of the liquid crystal display device can be improved by dividing the liquid crystal layer into two or more domains.

FIG. 8 is a layout view of a rubbed pattern formed in an alignment layer according to an embodiment of the present invention.

Referring to FIG. 8, liquid crystal molecules X1 and X2 are arranged differently according to the voltage applied to the common electrode 213 and the pixel electrode 215. For example, in the absence of voltage applied to the pixel electrode 215, that is, in an initially aligned state, the liquid crystal molecules are arranged in parallel with the direction in which the rubbed pattern P extends, and the rubbed pattern P having a zigzag configuration has two types of alignment of the liquid crystal molecules X1 and X2. As the voltage applied to the pixel electrode 215 increases, the liquid crystal molecules X1 rotate clockwise and the liquid crystal molecules X2 rotate counterclockwise. Thus, when the voltage applied to the pixel electrode 215 becomes maximum, the liquid crystal molecules are arranged in a direction perpendicular to the pixel electrode 215 and the common electrode 213, so that the liquid crystal molecules X1 and X2 are tilted so as to become liquid crystal molecules X1' and X2', respectively. While the relationship between the voltage applied to the pixel electrode 215 and alignment of liquid crystal molecules has been described through an exemplary embodiment, the present invention is not limited thereto. According to the embodiment of the present invention, since there are two types of alignment of the liquid crystal molecules X1 and X2, it is possible to suppress occurrence of a phenomenon in which a display screen of a liquid crystal display device turns blue or yellow according to the observation angle or viewing angle of the liquid crystal display device, which may occur when there is only one type of alignment of liquid crystal molecules.

In addition, an angle θ6 or θ7 between the rubbed pattern P and the common electrode 213 may be set so as not to exceed a predetermined range. In detail, arrangement of the liquid crystal molecules in the absence of voltage applied to the pixel electrode 215 becomes X1 or X2 due to the rubbed pattern P. Thus, since X2 is rotated within an angle range of (90°-θ6) and X4 is rotated within an angle range of (90°-θ7), an increase in the angle θ6 or θ7 may reduce a rotation angle range of liquid crystal molecules.

With regard to the angle between the rubbed pattern P and the common electrode 213, the same may be true of an angle between the rubbed pattern P and the pixel electrode 215, an angle between the rubbed pattern P and the data line 214 shown in FIG. 2, an angle between the rubbed pattern P and the imaginary center axis A1 shown in FIG. 7, an angle between the rubbed pattern P and the common electrode shown in FIG. 6, and an angle between the direction d1 extending from the common line 218.

Figure 9:
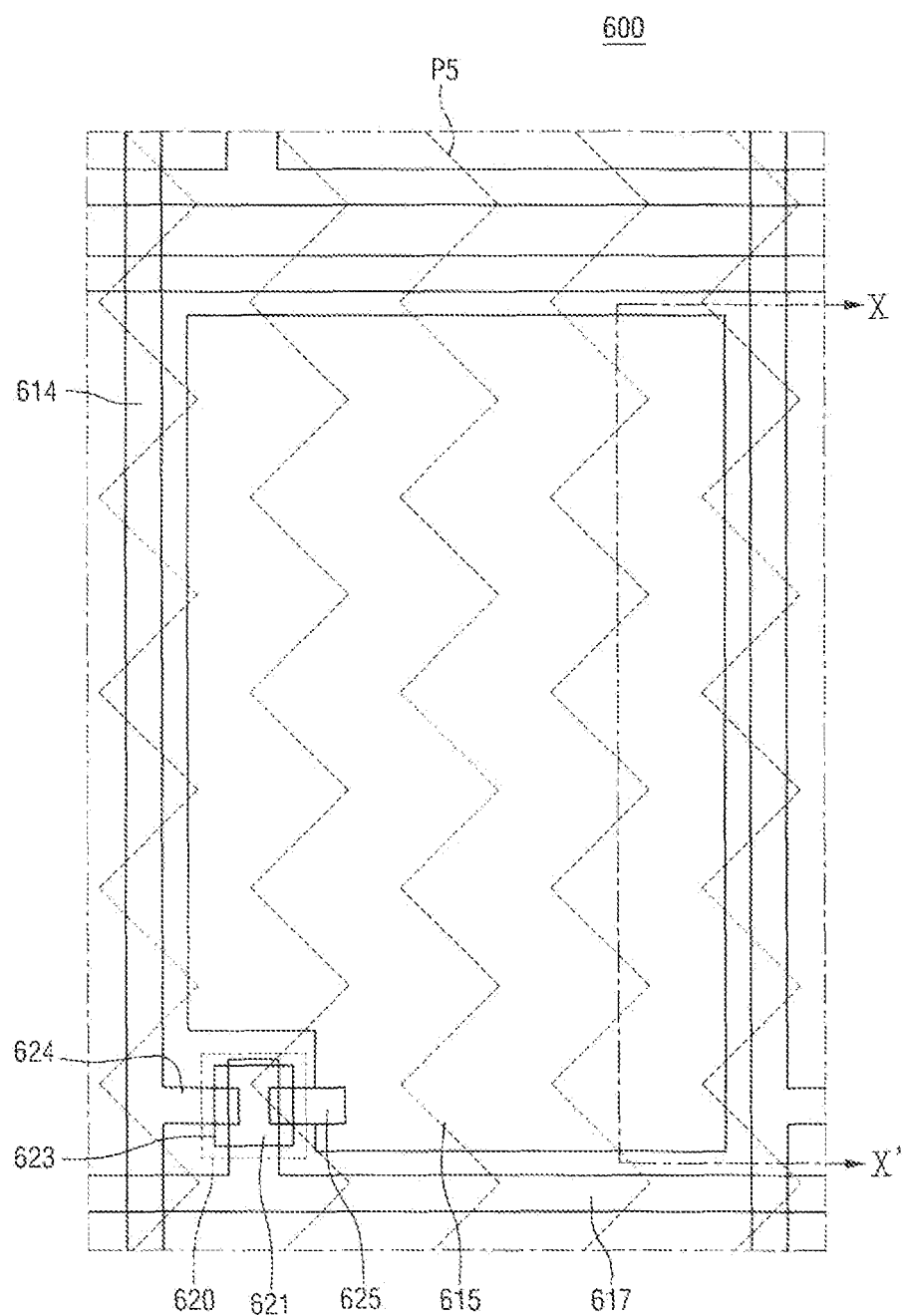
FIG. 9 is a layout view of a display panel according to another embodiment of the present invention.
Figure 10:
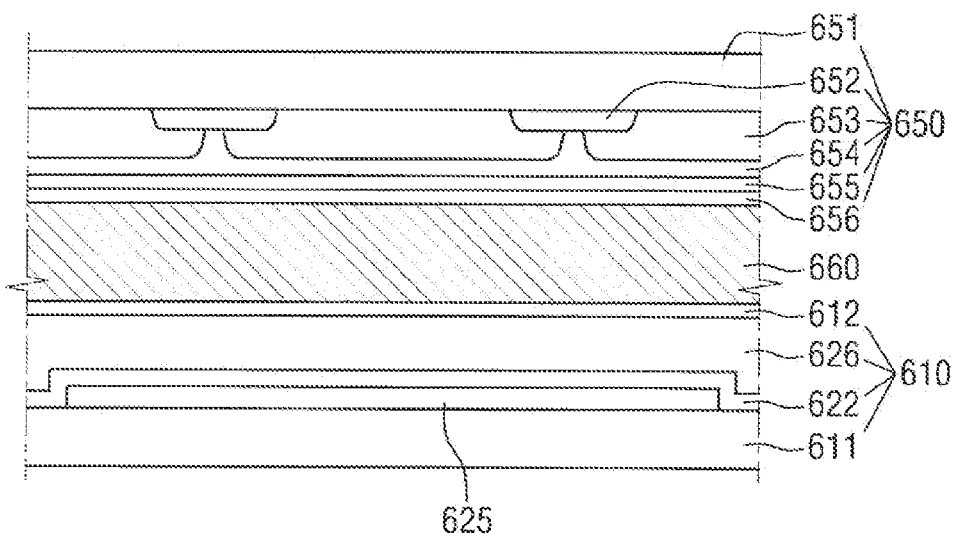
FIG. 10 is a cross-sectional view of the display panel taken along the line X-X' of FIG. 9.

FIG. 9 is a layout view of a display panel according to another embodiment of the present invention, and FIG. 10 is a cross-sectional view of the display panel taken along the line X-X' of FIG. 9.

Referring to FIGS. 9 and 10, the display panel 600 according to another embodiment of the present invention includes a first substrate 610, a second substrate 650 and a liquid crystal layer 660.

The first substrate 610 includes a first insulating substrate 611, a thin film transistor 620 formed on the first insulating substrate 611, a gate line 617, a pixel electrode 615, a data line 614, a data electrode 624, a drain electrode 625, an insulation layer 626 formed on the pixel electrode 615, and a first alignment layer 612 positioned on a contact surface between the first substrate 610 and the liquid crystal layer 660.

The pixel electrode 615 is opposed to the common electrode 655. The pixel electrode 615 is substantially the same as the pixel electrode shown in FIGS. 2 to 4, and repeated descriptions will be omitted.

Since the first insulating substrate 611, the thin film transistor 620, the gate line 617, the data line 614 and the first alignment layer 612 are substantially the same as the corresponding components shown in FIGS. 2 to 4, repeated descriptions thereof will be omitted.

The second substrate 650 includes a second insulating substrate 651, a black matrix 652 formed on the second insulating substrate 651, color filters 653, an overcoat layer 654, a common electrode 655, and a second alignment layer 656 positioned on a contact surface between the second substrate 650 and the liquid crystal layer 660.

The common electrode 655 may be formed on the entire bottom surface of the second insulating substrate 651, and may be made of a transparent material. Specifically, the common electrode 655 may be made of a transparent conductive material such as ITO or IZO.

Since the second insulating substrate 651 and the second alignment layer 656 are substantially the same as the second insulating substrate 251 and the first alignment layer 212 shown in FIG. 4, repeated descriptions thereof will be omitted.

According to this embodiment, the first alignment layer 612 or the second alignment layer 656 may have a zigzag-shaped rubbed pattern on a surface thereof contacting the liquid crystal layer 660. The first alignment layer 612 and the second alignment layer 656, each having a zigzag-shaped rubbed pattern, may be set to have different initial alignment directions of liquid crystal molecules so as to form two or more domains, thereby improving viewing angle of the liquid crystal display device.

Figure 11:
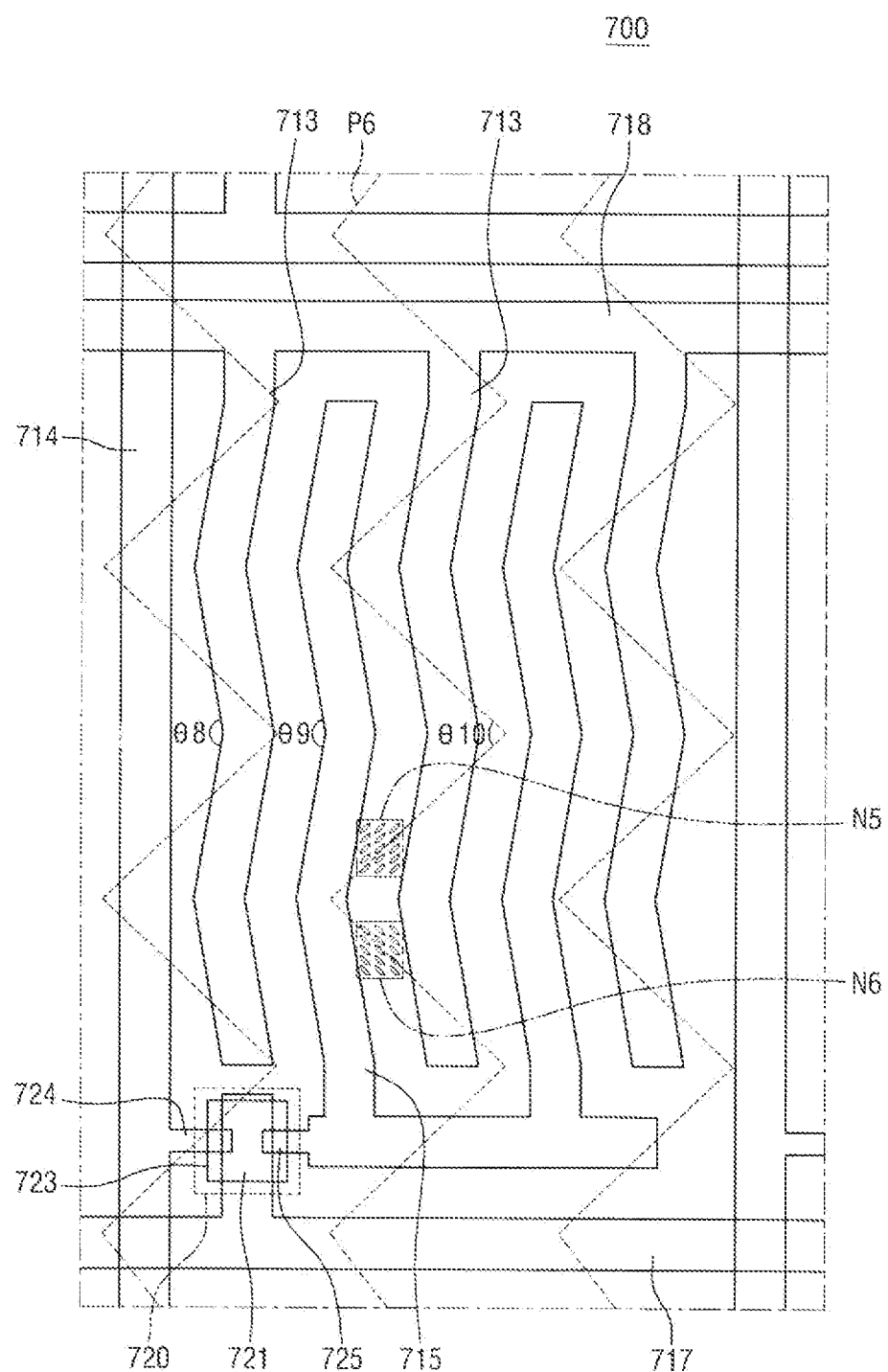
FIG. 11 is a layout view of a display panel according to still another embodiment of the present invention.

FIG. 11 is a layout view of a display panel according to still another embodiment of the present invention.

Referring to FIG. 11, the display panel 700 according to still another embodiment of the present invention includes a first substrate and a second substrate. The second substrate includes a zigzag-shaped common electrode 713 and a zigzag-shaped pixel electrode 715 formed in parallel so as to be adjacent to each other.

In some embodiments, a rubbed pattern P6 may have a zigzag configuration. A bent angle (θ8 or θ9) of the common electrode 713 or the pixel electrode 715 may be different from a bent angle (θ10) of the rubbed pattern P and a plurality of domains N5 and N6 having different initial alignment directions of liquid crystal molecules, thereby improving viewing angle of a liquid crystal display device.

Since the other components of the display panel 700 are substantially the same as those of the display panel shown in FIGS. 2 to 4, repeated descriptions will be omitted.

Figure 12:
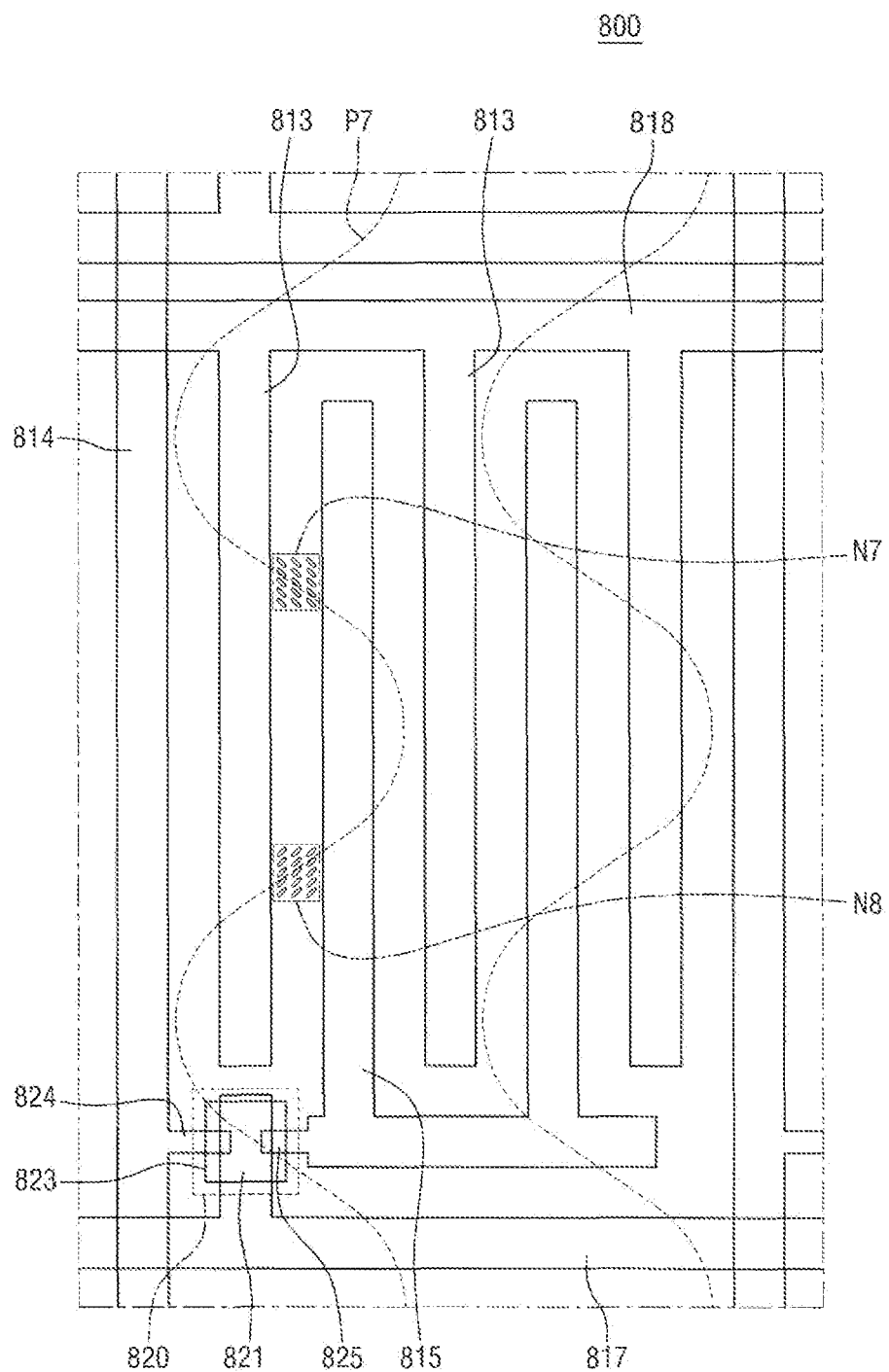
FIG. 12 is a layout view of a display panel according to still another embodiment of the present invention.

FIG. 12 is a layout view of a display panel according to still another embodiment of the present invention.

Referring to FIG. 12, the display panel 800 according to still another embodiment of the present invention includes a sinusoidal wave shaped rubbed pattern P7.

In some embodiments, the rubbed pattern P7 may have a sinusoidal wave shape. Alternatively, the rubbed pattern P7 may be formed in a curvilinear shape, which is not exactly the same as the sinusoidal wave shape. However, the rubbed pattern P7 is formed in a predetermined direction while performing curvilinear reciprocating motions at substantially the same pace. Since the initial alignment direction of liquid crystal molecules is determined according to the shape of the rubbed pattern P7, domains N7 and N8 having different initial alignment directions are formed. While FIG. 12 illustrates only two domains N7 and N8 by way of example, the rubbed pattern P7 is curved, and a plurality of domains having various initial alignment directions may be formed in addition to the domains N7 and N8. Therefore, the liquid crystal display device including the plurality of domains may have improved viewing angle.

Hereinafter, an apparatus of treating an alignment layer for forming a rubbed pattern will be described with reference to FIGS. 13 to 19.

Figure 13:
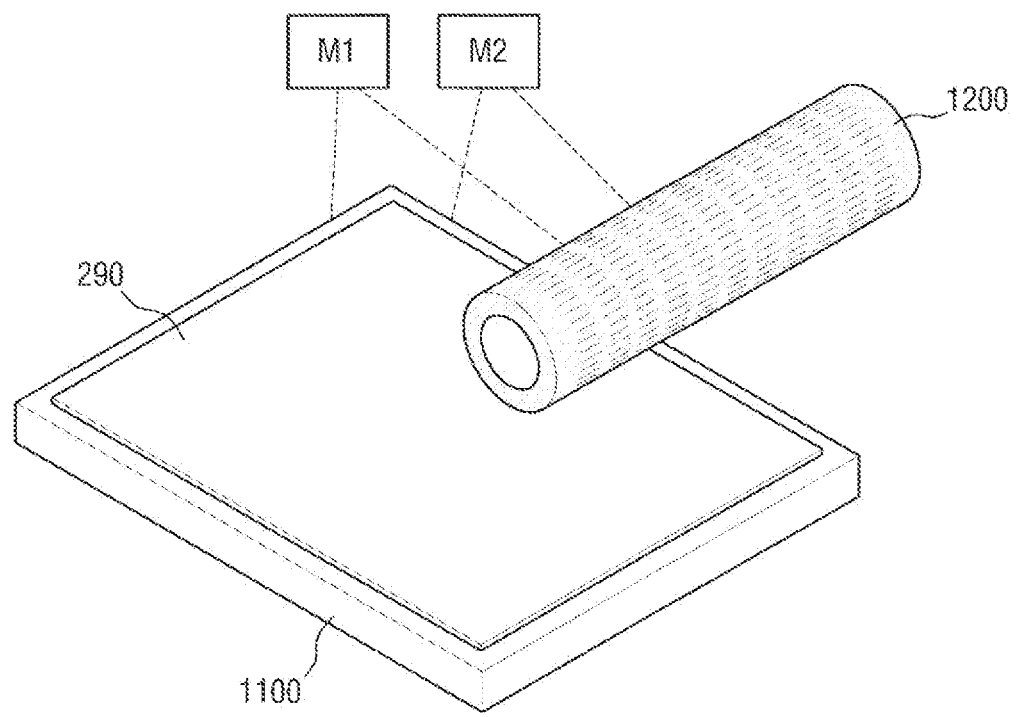
FIGS. 13 and 14 are perspective views of an apparatus for treating an alignment layer.
Figure 14:
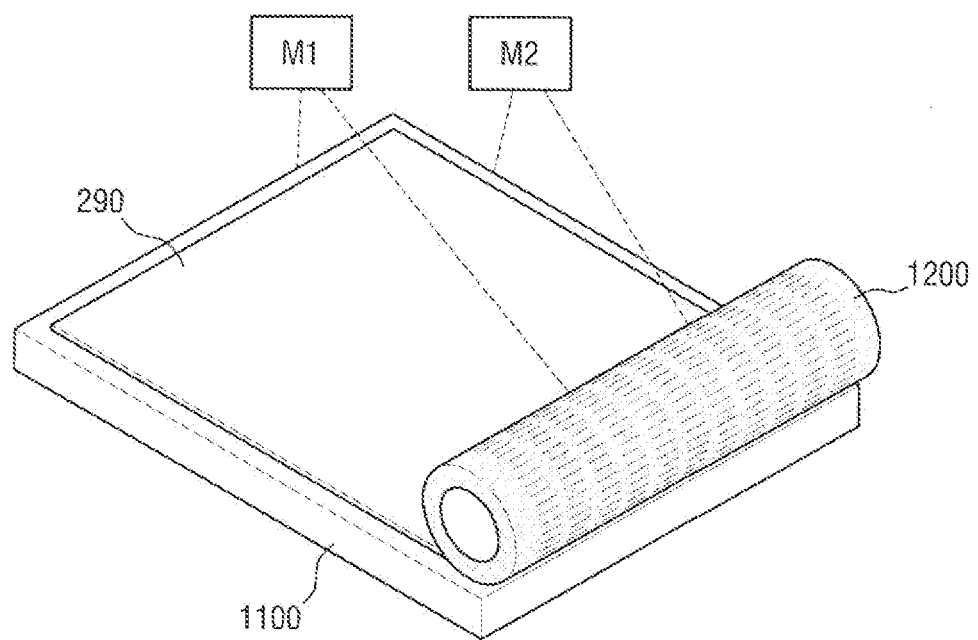
Figure 15:
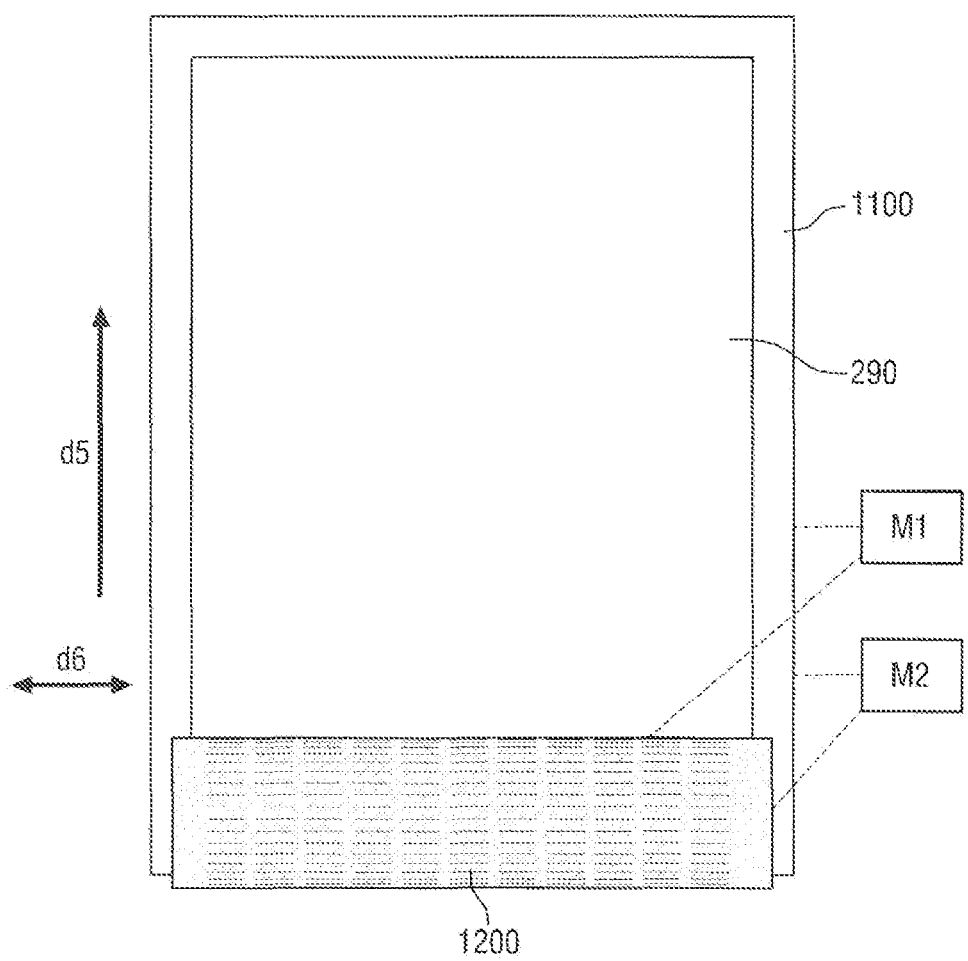
FIG. 15 is a plan view of the apparatus for treating an alignment layer.
Figure 16:
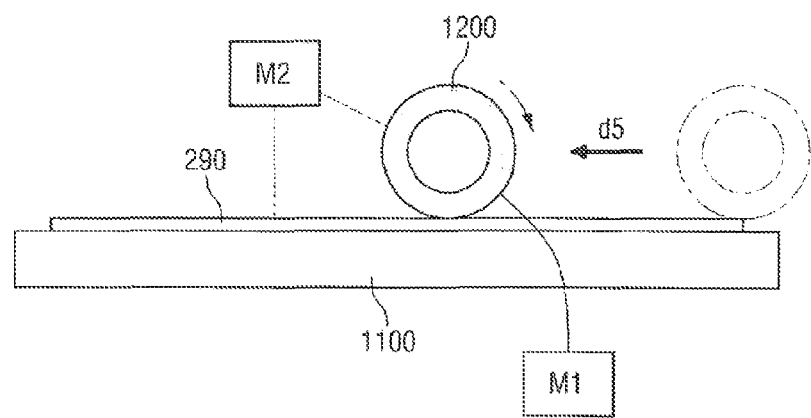
FIGS. 16 and 17 are cross-sectional views of the apparatus for treating an alignment layer.
Figure 17:
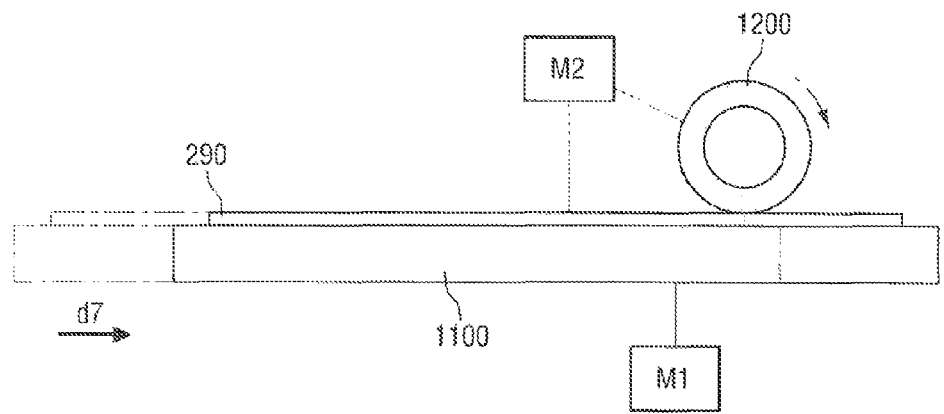
Figure 18:
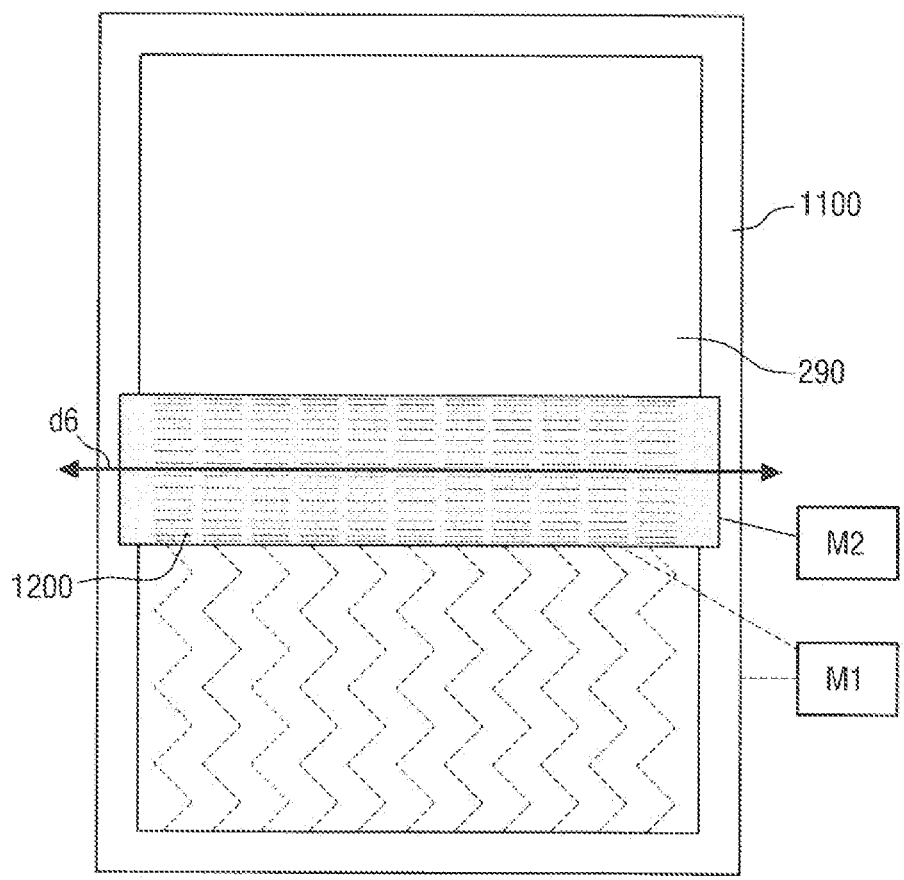
FIGS. 18 and 19 are plan views of the apparatus for treating an alignment layer.
Figure 19:
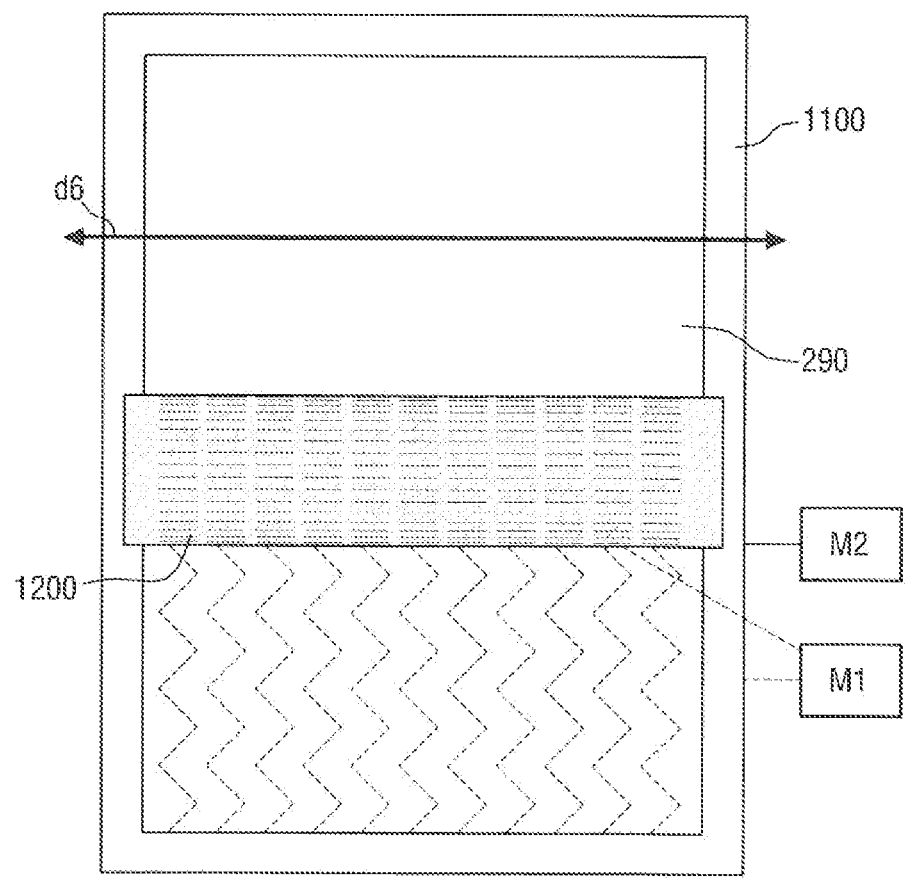

FIGS. 13 and 14 are perspective views of an apparatus for treating an alignment layer, FIG. 15 is a plan view of the apparatus for treating an alignment layer, FIGS. 16 and 17 are cross-sectional views of the apparatus for treating an alignment layer, and FIGS. 18 and 19 are plan views of the apparatus for treating an alignment layer.

Referring to FIG. 13, the apparatus for treating an alignment layer may include a support 1100, a rubbing member 1200, a first transfer means M1, and a second transfer means M2.

As shown in FIG. 13, the support 1100 allows a display panel 290 having an alignment layer on its one surface to be placed thereon. Although not shown, the support 1100 may further include a fastening unit for supporting the display panel 290. The fastening unit mechanically fixes the display panel 290. Alternatively, the fastening unit may fix the display panel 290 by adsorption.

The rubbing member 1200 may be shaped as a rotatable roller that is surface-treated with fabric. Although not shown, the rubbing member 1200 may be shaped as a non-rotatable roller. If the rubbing member 1200 is shaped as a rotatable roller, the roller may rotate in a clockwise direction, as shown in FIGS. 16 and 17. However, the roller may also rotate in a counterclockwise direction.

As shown in FIG. 13, the rubbing member 1200 may be spaced apart from the display panel 290 placed on the support 1100. As shown in FIG. 14, the rubbing member 1200 may be in contact with the display panel 290 placed on the support 1100. When the rubbing member 1200 is in contact with the display panel 290 placed on the support 1100, as shown in FIG. 14, a predetermined pressure may be applied to the display panel 290 by means of the rubbing member 1200.

As shown in FIG. 15, the alignment layer treating apparatus may rub an alignment layer using a rubbing member 1200 by allowing the rubbing member 1200 or the display panel 290 to reciprocate in a second direction d6 at a second relative speed while transferring the alignment layer in a first direction d5 at a first relative speed, in a state in which the rubbing member 1200 and the display panel 290 come into contact with each other. The first direction d5 and the second direction d6 may not be equal to each other, and an angle between the first direction d5 and the second direction d6 may not be 0° or 180°. For example, the first direction d5 and the second direction d6 may be perpendicular to each other.

The transfer of the display panel 290 or the rubbing member 1200 in the first direction d5 or the second direction d6 may be performed using the first transfer means M1 or the second transfer means M2.

The first transfer means M1 is capable of moving an object connected thereto in a particular direction. As an example, as shown in FIG. 16, the first transfer means M1 may be connected to the rubbing member 1200 and may transfer the rubbing member 1200 in the first direction d5. As another example, as shown in FIG. 17, the first transfer means M1 may be connected to the support 1100 and may transfer the support 1100 and the display panel 290 placed on the support 1100 in a direction d7 opposite to the first direction d5.

The second transfer means M2 allows an object connected thereto to reciprocate in a particular direction. In addition, the second transfer means M2 allows an object connected thereto to reciprocate by oscillation. In order to allow the object connected to the second transfer means M2 to reciprocate, the second transfer means M2 may include a piezoelectric actuator. As an example, as shown in FIG. 18, the second transfer means M2 may be connected to the rubbing member 1200, and may transfer the rubbing member 1200 in the second direction d6. As another example, as shown in FIG. 19, the second transfer means M2 may be connected to the support 1100, and may transfer the support 1100 and the display panel 290 placed on the support 1100 in the second direction d6.

Figure 20:
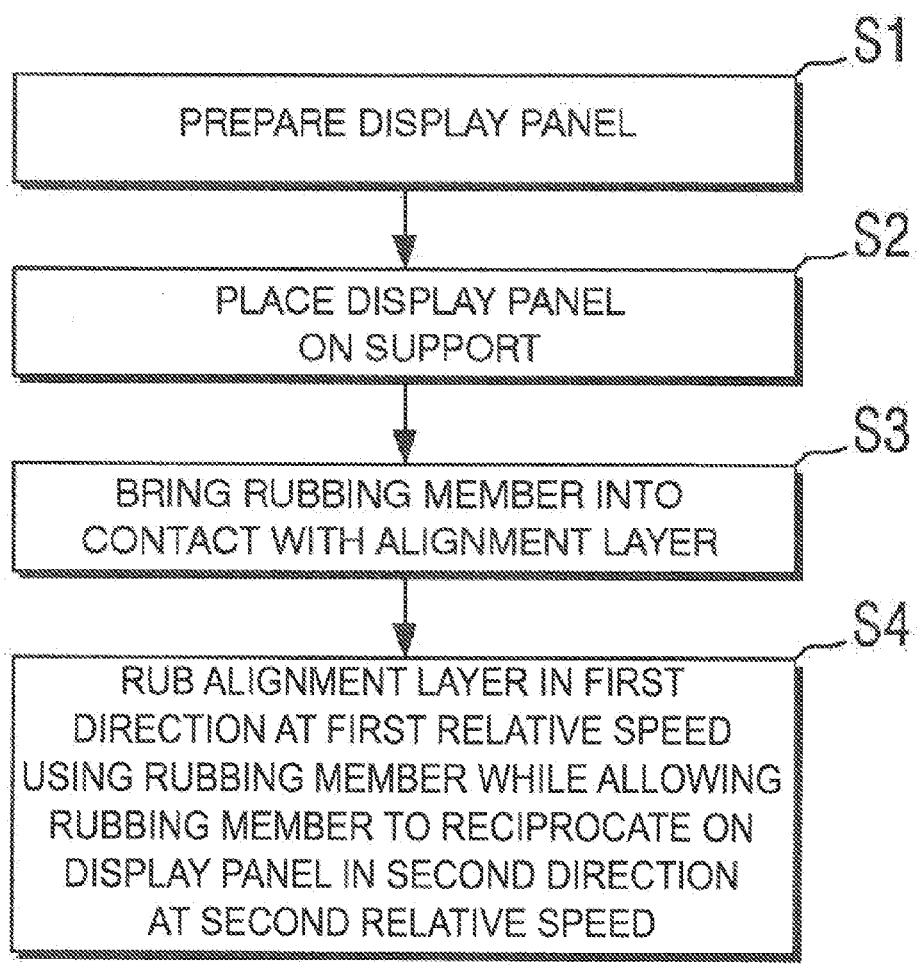
FIG. 20 is a flowchart illustrating a method of treating an alignment layer.

Hereinafter, a method of treating an alignment layer will be described with reference to FIGS. 13 to 19 and 20. FIG. 20 is a flowchart illustrating a method of treating an alignment layer.

Referring to FIG. 20, the method of treating an alignment layer includes preparing a display panel (S1), placing the display panel on a support (S2), bringing a rubbing member into contact with an alignment layer (S3), and rubbing the alignment layer in a first direction at a first relative speed using the rubbing member, while allowing the rubbing member to reciprocate on the display panel in a second direction at a second relative speed (S4).

In the preparation of the display panel (S1), the display panel may be one of the first substrate 210 and the second substrate 250 shown in FIG. 4, the first substrate 610 and the second substrate 650 shown in FIG. 10, or a display panel having an alignment layer on at least one surface thereof.

The placing of the display panel on the support (S2) may include placing the display panel 290 on the support 1100, as shown in FIG. 13. The placing of the display panel on the support (S2) may include placing the display panel on the support such that its surface, having the alignment layer formed thereon, is exposed. The display panel 290 may be fixed to the support 1100. Although not shown, the display panel 290 may be fixed to the support 1100 by means of a fastening unit.

The bringing of the rubbing member into contact with an alignment layer (S3) may include bringing the rubbing member 1200 on one surface of the display panel 290. Here, the one surface of the display panel contacting the rubbing member 1200 may have the alignment layer formed thereon. A predetermined pressure may be applied to the display panel 290 by use of the rubbing member 1200 while the rubbing member 1200 contacts the one surface of the display panel 290.

The rubbing of the alignment layer (S4) may include allowing the rubbing member 1200 to reciprocate in the second direction d6 at a second relative speed while transferring the rubbing member 1200 relative to the display panel 290 in a first direction d5 at a first relative speed, in a state in which the rubbing member 1200 is brought into contact with the alignment layer formed on one surface of the display panel 290.

The first direction d5 and the second direction d6 are not equal to each other. For example, the first direction d5 and the second direction d6 may be perpendicular to each other.

According to this embodiment, when the rubbing member 1200 is allowed to reciprocate in the second direction d6 with respect to the display panel 290, the reciprocating may be performed at a pace ranging from 0.2 to 3 millimeters.

As shown in FIG. 16, in order to transfer the rubbing member 1200 in the first direction d5 with respect to the display panel 290, the display panel 290 may be transferred in the first direction d5. The transferring of the rubbing member 1200 in the first direction d5 may be performed using the first transfer means M1 connected to the rubbing member 1200.

As shown in FIG. 17, in order to transfer the rubbing member 1200 in the first direction d5 with respect to the display panel 290, the display panel 290 may be transferred in a direction d7 opposite to the first direction d5. The transferring of the rubbing member 1200 in the first direction d5 may be performed using the first transfer means M1 connected to the rubbing member 1200.

In order to transfer the display panel 290 in the direction d7 opposite to the first direction d5, the support 1100 may also be transferred in the direction d7 opposite to the first direction d5 along with the display panel 290. The transferring of the display panel 290 in the direction d7 opposite to the first direction d5 may be performed using the first transfer means M1 connected to the support 1100.

As shown in FIG. 18, in order to allow the rubbing member 1200 to reciprocate in the second direction d6 with respect to the display panel 290, the rubbing member 1200 may be allowed to reciprocate in the second direction d6. The reciprocating of the rubbing member 1200 in the second direction d6 may be performed using the second transfer means M2 connected to the rubbing member 1200.

As shown in FIG. 19, in order to allow the rubbing member 1200 to reciprocate in the second direction d6 with respect to the display panel 290, the display panel 290 may be allowed to reciprocate in the second direction d6. In order to allow the display panel 290 to reciprocate in the second direction d6, the support 1100 may be allowed to reciprocate in the second direction d6 along with the display panel 290. The reciprocating of the display panel 290 in the second direction d6 may be performed using the second transfer means M2 connected to the support 1100.

The second transfer means M2 oscillates the rubbing member 1200 or the display panel 290 connected thereto in the second direction d6 with a predetermined number of oscillations, thereby allowing the rubbing member 1200 or the display panel 290 to reciprocate.

While the present invention has been particularly shown and described with reference to exemplary embodiments thereof, it will be understood by those of ordinary skill in the art that various changes in form and detail may be made therein without departing from the spirit and scope of the present invention as defined by the following claims. It is, therefore, desired that the present embodiments be considered in all respects as illustrative and not restrictive, reference being made to the appended claims rather than the foregoing description to indicate the scope of the invention.

In concluding the detailed description, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation.

What is claimed is:

1. An alignment layer for a display device, said alignment layer comprising:
   a plurality of rubbed patterns formed on a surface of the alignment layer, each rubbed pattern including first patterns intersecting a center axis at a first angle and second patterns intersecting the center axis at a second angle, and each rubbed pattern formed in a continuous zigzag shape by connecting the first and second patterns which are alternately repeated along the center axis.

2. The alignment layer of claim 1, the first angle is different from the second angle.

3. A liquid crystal display device, comprising:
   a first insulating substrate;
   a second insulating substrate positioned above the first insulating substrate and facing the first insulating substrate; and
   a liquid crystal layer formed between the first insulating substrate and the second insulating substrate;
   at least one of the first insulating substrate and the second insulating substrate including an alignment layer formed on a surface facing the liquid crystal layer, said alignment layer comprising a plurality of rubbed patterns formed on a surface of the alignment layer, each rubbed pattern including first patterns intersecting a center axis at a first angle and second patterns intersecting the center axis at a second angle, and each rubbed pattern formed in a continuous zigzag shape by connecting the first and second patterns which are alternately repeated along the center axis.

4. The liquid crystal display device of claim 3, further comprising:
   a common electrode formed on one surface of the second insulating substrate; and
   a pixel electrode formed on said one surface of the first insulating substrate and facing the common electrode.

5. The liquid crystal display device of claim 3, further comprising:
   a common electrode formed on one surface of the first insulating substrate; and
   a pixel electrode formed on said one surface of the first insulating substrate and located adjacent to the common electrode.

6. The liquid crystal display device of claim 3, the first patterns and the second patterns have a same length.

7. A method of treating an alignment layer, the method comprising the steps of:
   preparing a display panel having an alignment layer on one surface of the display panel;
   placing the display panel on a support;
   bring a rubbing member into contact with the alignment layer; and
   rubbing the alignment layer by transferring the alignment layer and the rubbing member with respect to each other;
   the step of rubbing the alignment layer comprises transferring one of the rubbing member and the alignment layer in a first direction while allowing the rubbing member to reciprocate relative to the alignment layer in a second direction different from the first direction so as to form a plurality of rubbed patterns formed on a surface of the alignment layer, each rubbed pattern including first patterns intersecting a center axis at a first angle and second patterns intersecting the center axis at a second angle, and each rubbed pattern formed in a continuous zigzag shape by connecting the first and second patterns which are alternately repeated along the center axis.

8. The method of claim 7, the first direction is perpendicular to the second direction.

9. The method of claim 8, the rubbing member reciprocates at a pace ranging from 0.2 to 3 millimeters.

10. The method of claim 7, the rubbing member is allowed to reciprocate in the second direction while transferring the rubbing member in the first direction.

11. The method of claim 7, the rubbing member is allowed to reciprocate in the second direction while moving the display panel in a direction opposite to the first direction.

* * * * *